Feb. 20, 1940.   J. H. DORAN   2,191,343
ELASTIC FLUID TURBINE CONDENSER ARRANGEMENT
Filed March 15, 1938
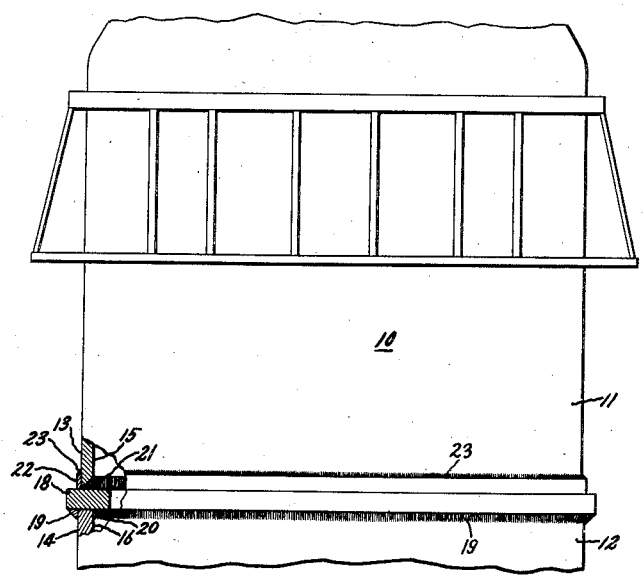
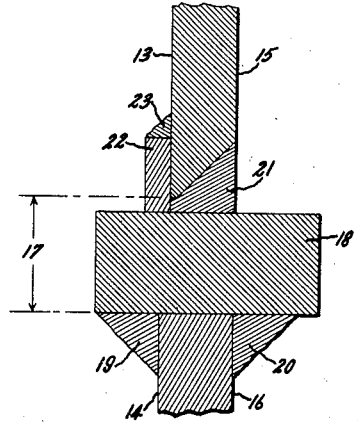
Inventor:
John H. Doran,
by Harry E. Dunham
His Attorney.

Patented Feb. 20, 1940

2,191,343

UNITED STATES PATENT OFFICE 2,191,343

ELASTIC FLUID TURBINE CONDENSER ARRANGEMENT

John H. Doran, Scotia, N. Y., assignor to General Electric Company, a corporation of New York Application March 15, 1938, Serial No. 196,006

1 Claim. (Cl. 285—111)

The present invention relates to elastic fluid turbine condenser arrangements comprising an elastic fluid turbine and a condenser connected to the exhaust end thereof to receive and condense fluid discharged from the turbine. More specifically the invention relates to the kind of arrangements in which the condenser is welded to the exhaust opening of the turbine. Experience with such welded constructions has shown that they require a large amount of expensive welding material, mainly due to the fact that the exhaust opening of the turbine and the inlet opening of the condenser are not uniformly spaced and do not always align after the turbine and the condenser have been installed. Such misalignment occurs especially in case of welded fabricated turbine and condenser structures due to the warping of the relatively thin metal plates during manufacture.

The object of my invention is to provide improved arrangement for uniting a turbine with its condenser whereby the above drawback is overcome.

For a consideration of what I believe to be novel and my invention, attention is directed to the following description and the claims appended thereto in connection with the accompanying drawing.

In the drawing, Fig. 1 illustrates a welded turbine condenser arrangement embodying my invention, and Fig. 2 is an enlarged detail view of Fig. 1.

The arrangement comprises an elastic fluid turbine 10 which in the present instance has a fabricated casing forming an exhaust conduit 11. The conduit 11 is connected to an inlet conduit 12 of a condenser. The conduits 11 and 12 have outer surfaces 13 and 14 and inner surfaces 15 and 16 respectively which do not align when assembled. The spacing 17 between the two conduits may vary at different points. In order to unite the two conduits with the use of a minimum amount of welding material I provide one of them, in the present instance the conduit 12, with a flange 18 extending outwardly beyond the surface 14 and inwardly beyond the surface 16. In the present example the flange 18 is formed by an annular strip of material fastened to the inlet conduit 12 of the condenser by welds 19 and 20. The upper surface of the flange 18 is united with the conduit 11 by a weld 21. In order to facilitate the provision of the weld 21, I provide an outer strip of material 22 secured to the outer surface 13 of the conduit 11 by a weld 23. The strip or ring 22 on one side bridges the opening, that is backs up the joint, formed between the conduit 13 and the flange 18 and thereby prevents the material of the weld 21 from flowing outward during the welding process.

Thus, with my invention I have accomplished an improved turbine condenser arrangement in which the condenser inlet is welded to the turbine exhaust opening by a comparatively small amount of welding material. The cost of producing such welding connection is therefore substantially reduced by my invention. In addition the provision of the flange 18 and the strip 22 give the connection a decidedly better appearance than can be attained with the old method and arrangement of connecting a condenser to a turbine by welding.

What I claim as new and desired to secure by Letters Patent of the United States is:

Elastic fluid turbine condenser arrangement comprising a turbine having a casing forming an exhaust conduit, a condenser having an inlet conduit with a face spaced irregularly from the face of the exhaust conduit, and means connecting the two conduits comprising a flange at the opening of one of the conduits and projecting inwardly and outwardly from the inner and outer surfaces respectively of such conduit, a strip welded to the other conduit to back up the irregular opening between the other conduit and the flange, and a weld uniting the other conduit and the strip with the flange.

JOHN H. DORAN.